United States Patent
Yamashita et al.

(10) Patent No.: US 10,753,272 B2
(45) Date of Patent: Aug. 25, 2020

(54) ENGINE SUPERCHARGER FOR MAINTAINING A BATTERY CHARGE

(71) Applicant: MITSUBISHI HEAVY INDUSTRIES, LTD., Tokyo (JP)

(72) Inventors: Yukio Yamashita, Tokyo (JP); Hiroyoshi Kubo, Tokyo (JP); Mitsufumi Goto, Tokyo (JP); Musashi Sakamoto, Tokyo (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 504 days.

(21) Appl. No.: 15/533,709

(22) PCT Filed: Jan. 30, 2015

(86) PCT No.: PCT/JP2015/052657
§ 371 (c)(1),
(2) Date: Jun. 7, 2017

(87) PCT Pub. No.: WO2016/121092
PCT Pub. Date: Aug. 4, 2016

(65) Prior Publication Data
US 2017/0328272 A1   Nov. 16, 2017

(51) Int. Cl.
*F02B 37/24* (2006.01)
*F02B 39/10* (2006.01)
(Continued)

(52) U.S. Cl.
CPC ............ *F02B 37/24* (2013.01); *F02B 37/004* (2013.01); *F02B 37/013* (2013.01); *F02B 37/10* (2013.01); *F02B 39/10* (2013.01); *Y02T 10/144* (2013.01)

(58) Field of Classification Search
CPC ........ F02B 37/24; F02B 37/10; F02B 37/013; F02B 37/004; F02B 39/10; Y02T 10/144
(Continued)

(56) References Cited

U.S. PATENT DOCUMENTS

| 6,684,863 B2 * | 2/2004 | Dixon | F02B 39/10 |
| | | | 123/559.1 |
| 7,478,533 B2 * | 1/2009 | Ueno | F02B 37/004 |
| | | | 290/52 |

(Continued)

FOREIGN PATENT DOCUMENTS

| EP | 1300562 A1 | 4/2003 |
| EP | 1749990 A2 | 2/2007 |

(Continued)

OTHER PUBLICATIONS

Extended European Search Report, dated May 7, 2018, for European Application No. 15879989.0.
(Continued)

*Primary Examiner* — Laert Dounis
*Assistant Examiner* — Edward Bushard
(74) *Attorney, Agent, or Firm* — Birch, Stewart, Kolasch & Birch, LLP

(57) ABSTRACT

A supercharging system includes a first supercharger including a first compressor; a second supercharger including a second compressor provided downstream of the first compressor, and a controller controlling the first and second superchargers. At least one of the first and second superchargers includes an electric motor for driving the first or second compressor. At least one of the first and second superchargers includes a turbine, and a nozzle vane that adjusts a flow-path area of the exhaust gas flowing into the turbine. When a charge amount of a battery is low, the controller sets an upper limit of an output command value
(Continued)

for the motor to be lower than when the charge amount is not low, or starts regenerative operation of the motor. A vane control part controls an opening degree of the nozzle vane so that the flow-path area decreases with a control of the electric motor.

9 Claims, 8 Drawing Sheets

(51) Int. Cl.
  *F02B 37/013* (2006.01)
  *F02B 37/10* (2006.01)
  *F02B 37/00* (2006.01)
(58) Field of Classification Search
  USPC .......................................................... 123/561
  See application file for complete search history.

(56) References Cited

U.S. PATENT DOCUMENTS

| | | | | |
|---|---|---|---|---|
| 2003/0005695 | A1* | 1/2003 | Allen | F02B 37/10 60/608 |
| 2006/0236692 | A1* | 10/2006 | Kolavennu | F01N 3/0807 60/602 |
| 2007/0033938 | A1 | 2/2007 | Ueno | |
| 2009/0205331 | A1* | 8/2009 | Marsh | F02B 25/12 60/599 |

FOREIGN PATENT DOCUMENTS

| | | |
|---|---|---|
| EP | 2006507 A1 | 12/2008 |
| JP | 2006-144776 A | 6/2006 |
| JP | 2007-9873 A | 1/2007 |
| JP | 2008-255940 A | 1/2007 |
| JP | 2007-262970 A | 10/2007 |
| JP | 4295753 B2 | 7/2009 |
| JP | 4433051 B2 | 3/2010 |
| JP | 2011-80398 A | 4/2011 |
| JP | 2013-238141 A | 4/2011 |
| JP | 2011-174470 A | 9/2011 |
| JP | 2013-181392 A | 9/2013 |

OTHER PUBLICATIONS

Office Action dated Jan. 5, 2018 issued to the corresponding Japanese Application No. 2016-571631 with English Translation.
Chinese Office Action for Chinese Application No. 201580068797. 1, dated Apr. 15, 2019, with English translation.
An et al., "Development of Variable Two-stage Turbocharger for Passenger Car Diesel Engines," Mitsubishi Heavy Industries Technical Review, vol. 47, No. 4, Dec. 2010, pp. 1-11, with an English translation.
International Preliminary Report on Patentability and Written Opinion of the International Searching Authority (PCT/IB/373, PCT/ISA/237, PCT/IB/338 and PCT/IB/326), dated Aug. 10, 2017, for International Application No. PCT/JP2015/052657, along with an English translation.
International Search Report (forms PCT/ISA/210 and PCT/ISA/220), dated Apr. 21, 2015, for International Application No. PCT/JP2015/052657, along with an English translation.
Chinese Office Action and Search Report, dated Oct. 22, 2018, for Chinese Application No. 201580068797.1, with an English translation.
European Office Action, dated Dec. 20, 2018, for European Application No. 15879989.0.
European Office Action, dated Sep. 24, 2019, for European Application No. 15879989.0.

* cited by examiner

ENGINE SUPERCHARGER FOR MAINTAINING A BATTERY CHARGE

TECHNICAL FIELD

The present disclosure relates to a supercharging system, a control device for the supercharging system, and a method for operating the supercharging system.

BACKGROUND ART

A known supercharger includes an electric motor driven by a battery.

For instance, Patent Document 1 discloses a turbocharger including an electric motor driven by a battery. In this turbocharger, rotation of an exhaust turbine is assisted by an electric motor to increase the rotation speed of the exhaust turbine at an early stage.

CITATION LIST

Patent Literature

Patent Document 1: JP4433051B

SUMMARY

Problems to be Solved

In the turbocharger disclosed in Patent Document 1, when the amount of charge of the battery is low, assist of the exhaust turbine by the electric motor is prohibited, and the opening degree of variable nozzles is controlled to adjust the boost pressure. Accordingly, in a single-stage supercharging system including one motored supercharger, it is possible to adjust the boost pressure through a relatively simple control of controlling the opening degree of variable nozzles in a direction to maintain the boost pressure when the electric motor is stopped.

In contrast, in a supercharging system including a plurality of turbochargers, there are more control targets than in the above single-stage supercharging system and thus the control is complicated, which raises the risk of deterioration of drivability due to rapid reduction in the engine output and the vehicle speed, unless a suitable control is performed when the amount of charge of the battery is low.

In view of the above, an object of at least one embodiment of the present invention is to provide a supercharging system provided with a plurality of superchargers, whereby it is possible to mitigate deterioration of drivability due to a decrease in the amount of charge of a battery.

Solution to the Problems (1) A supercharging system according to at least one embodiment of the present invention comprises: a first supercharger including a first compressor for compressing air to be supplied to an engine; a second supercharger including a second compressor for further compressing air compressed by the first compressor; and a controller for controlling the first supercharger and the second supercharger. At least one of the first supercharger or the second supercharger further includes an electric motor for driving the first compressor or the second compressor. At least one of the first supercharger or the second supercharger further includes a turbine configured to be rotary driven by exhaust gas from the engine, and a nozzle vane configured to adjust a flow-path area of the exhaust gas flowing into the turbine. The controller includes: an electric motor control part configured to, if an amount of charge of a battery for supplying electric power to the electric motor is less than a first threshold, set an upper limit value of an output command value for the electric motor to be lower than when the amount of charge of the battery is not less than the first threshold, or switch operation of the electric motor to regenerative operation; and a vane control part configured to, if the amount of charge of the battery is less than the first threshold, control an opening degree of the nozzle vane so that the flow-path area decreases with a control of the electric motor by the electric motor control part.

In a supercharger rotary driven by an electric motor, the boost pressure decreases in response to reduction of the output of the electric motor. Also, in a supercharger rotary driven by an electric motor, assist power of the electric motor is zero when the operation of the electric motor is switched to regenerative operation, and thus the boost pressure decreases. Furthermore, in a supercharger having a nozzle vane configured to be capable of adjusting the flow-path area of exhaust gas flowing into a turbine, the boost pressure increases in response to reduction of the opening degree of the nozzle vane and of the flow-path area.

With the above configuration (1), if the amount of charge of the battery decreases and becomes less than the first threshold, the upper limit value of the output command value for the electric motor is set to be lower than when the amount of charge is not less than the threshold, or the operation of the electric motor is switched to the regenerative operation and the opening degree of the nozzle vane is reduced. That is, the opening degree of the nozzle vane is reduced to increase the boost pressure in response to a decrease in the boost pressure due to a decrease in the output command value for the electric motor or switch to regenerative operation, and thereby it is possible to ensure a boost pressure by the supercharging system while performing a control by the electric motor control part. Thus, it is possible to mitigate deterioration of drivability due to a decrease in the amount of charge of the battery.

Further, the upper limit value of the output command value for the electric motor is set to be lower when the amount of charge of the battery decreases, and thereby it is possible to retard exhaustion of the battery. Alternatively, the operation of the electric motor is switched to the regenerative operation when the amount of charge of the battery decreases, and thereby it is possible to have the amount of charge of the battery recovered.

(2) In some embodiments, in the above configuration (1), the electric motor control part is configured to: set, if the amount of charge of the battery is less than the first threshold and not less than a second threshold which is smaller than the first threshold, the upper limit value of the output command value for the electric motor to a value which is greater than zero and smaller than when the amount of charge of the battery is not less than the first threshold; and set, if the amount of charge of the battery is less than the second threshold, the upper limit value of the output command value for the electric motor to zero.

With the above configuration (2), the upper limit value of the output command value for the electric motor is set to a value larger than zero if the amount of charge of the battery reduces and becomes less than the first threshold, and the upper limit value of the output command value for the electric motor is set to zero if the amount of charge of the battery is less the second threshold which is smaller than the first threshold. Accordingly, the upper limit value of the output command value for the electric motor is reduced in stages with a decrease in the amount of charge of the battery. Thus, compared to a case in which the electric motor is stopped immediately after the amount of charge of the battery becomes low, the output of the electric motor is reduced gradually, which mitigates deterioration of drivability.

(3) In some embodiments, in the above configuration (1) or (2), the controller further includes a threshold determination part configured to determine the first threshold and the second threshold on the basis of a load of an alternator configured to be driven by the engine to generate electric power to be supplied to the electric motor.

With the above configuration (3), the threshold for the amount of charge of the battery that limits the upper limit value of the output command value for the electric motor is determined in response to the load of the alternator, and thereby it is possible to control the output of the electric motor appropriately in response to the condition of power supply by the alternator and the battery.

(4) In some embodiments, in the above configuration (3), the threshold determination part is configured to increase the first threshold and the second threshold with an increase in the load of the alternator.

With the above configuration (4), if the load of the alternator increases and the output margin of the alternator decreases, the first threshold and the second threshold are increased and the output of the electric motor is limited while the amount of charge of the battery is relatively large, and thereby it is possible to maintain the amount of charge of the battery appropriately.

(5) In some embodiments, in any one of the above configurations (1) to (4), the electric motor control part is configured to, if the amount of charge of the battery is less than the first threshold and the opening degree of the nozzle vane is not less than a third threshold, switch the operation of the electric motor to the regenerative operation.

With the above configuration (5), the operation of the electric motor is switched to regenerative operation when the opening degree of the nozzle vane is not less than a predetermined third threshold, that is, when there is room to reduce the opening degree of the nozzle vane to below the third threshold to further increase the boost pressure, and thereby it is possible to recover the amount of charge of the battery through regenerative operation while maintaining the boost pressure.

(6) In some embodiments, in any one of the above configurations (1) to (5), the electric motor control part is configured to determine a target regeneration amount by the electric motor on the basis of the opening degree of the nozzle vane and to control a regeneration amount by the electric motor to the target regeneration amount.

With the above configuration (6), the regeneration amount by the electric motor is controlled to the target regeneration amount determined on the basis of the opening degree of the nozzle vane, and thereby it is possible to perform regenerative operation of the electric motor at an appropriate regenerative amount corresponding to the opening degree of the nozzle vane. For instance, it is possible to prevent shortage of the boost pressure due to regenerative operation at an excessive regenerative amount.

(7) In some embodiments, in the above configuration (6), the electric motor control part is configured to reduce the target regeneration amount with a decrease in the opening degree of the nozzle vane.

With the above configuration (7), the target regeneration amount is reduced as the opening degree of the nozzle vane decreases and the room to make up for shortage of supercharging decreases, and thus it is possible to maintain the boost pressure by the supercharging system appropriately.

(8) In some embodiments, in any one of the above configurations (1) to (7), the electric motor control part is configured to determine a target regeneration amount by the electric motor on the basis of an amount of charge of the battery and to control a regeneration amount by the electric motor to the target regeneration amount.

With the above configuration (8), the regeneration amount by the electric motor is controlled to the target regeneration amount determined on the basis of the amount of charge of the battery, and thereby it is possible to perform regenerative operation of the electric motor at an appropriate regenerative amount corresponding to the amount of charge of the battery.

(9) In some embodiments, in the above configuration (8), the electric motor control part is configured to reduce the target regeneration amount with a decrease in a difference between a maximum capacity of the battery and the amount of charge of the battery.

With the above configuration (9), if there is a sufficient amount of charge in the battery, the target regeneration amount is set to be low, and thereby the regeneration amount is reduced and the boost pressure by the supercharging system can be ensured in priority.

(10) In some embodiments, in any one of the above configurations (1) to (9), the one of the first supercharger or the second supercharger is an electric motor-driven supercharger including the electric motor coupled to the first compressor or the second compressor. The electric motor control part is configured to, if the amount of charge of the battery is less than the first threshold, set the upper limit value of the output command value to zero and drive the electric motor in a regeneration mode through rotation of the first compressor or the second compressor by intake air.

An electric supercharger is not provided with a turbine, and thus cannot operate the electric motor in a regeneration mode with energy recovered from exhaust gas of the engine.

In this regard, with the above configuration (10), the output of the electric motor is set to zero and the electric motor is driven in the regeneration mode through rotation of the compressor by intake air, and thereby it is possible to regeneratively operate the electric motor of the electric supercharger to charge the battery.

(11) A controller according to at least one embodiment of the present invention is for the supercharging system according to any one of the above (1) to (10), and comprises: an electric motor control part configured to, if an amount of charge of a battery for supplying power to the electric motor is less than a first threshold, set an upper limit value of an output command value for the electric motor to be lower than when the amount of charge of the battery is not less than the first threshold, or switch operation of the electric motor to regenerative operation; and a vane control part configured to, if the amount of charge of the battery is less than the first threshold, control an opening degree of the nozzle vane so that the flow-path area decreases with a control of the electric motor by the electric motor control part.

With the above configuration (11), if the amount of charge of the battery decreases and becomes less than the first threshold, the upper limit value of the output command value for the electric motor is set to be lower than when the amount of charge is not less than the threshold, or the operation of the electric motor is switched to the regenerative operation, and the opening degree of the nozzle vane is reduced. That is, the opening degree of the nozzle vane is reduced to increase the boost pressure in response to a decrease in the boost pressure due to a decrease in the output command value for the electric motor or switch to regenerative operation, and thereby it is possible to ensure a boost pressure by the supercharging system while performing a control by the electric motor control part. Thus, it is possible to mitigate deterioration of drivability due to a decrease in the amount of charge of the battery.

Further, the upper limit value of the output command value for the electric motor is set to be lower when the amount of charge of the battery decreases, and thereby it is possible to retard exhaustion of the battery. Alternatively, the operation of the electric motor is switched to the regenerative operation when the amount of charge of the battery decreases, and thereby it is possible to have the amount of charge of the battery recovered.

(12) A method of operating a supercharging system which comprises: a first supercharger including a first compressor for compressing air to be supplied to an engine; and a second supercharger including a second compressor for further compressing air compressed by the first compressor, at least one of the first supercharger or the second supercharger further including an electric motor for driving the first compressor or the second compressor, and at least one of the first supercharger or the second supercharger further including a turbine configured to be rotary driven by exhaust gas from the engine, and a nozzle vane configured to adjust a flow-path area of the exhaust gas flowing into the turbine, according to at least one embodiment of the present invention, comprises: an amount-of-charge obtaining step of obtaining an amount of charge of a battery for supplying electric power to the electric motor; an electric motor control step of, if the amount of charge of the battery is less than a first threshold, setting an upper limit value of an output command value for the electric motor to be lower than when the amount of charge of the battery is not less than the first threshold, or switching operation of the electric motor to regenerative operation; and a vane opening-degree control step of, if the amount of charge of the battery is less than the first threshold, controlling an opening degree of the nozzle vane so that the flow-path area decreases with a control of the electric motor in the electric motor control step.

According to the above method (12), if the amount of charge of the battery decreases and becomes less than the first threshold, the upper limit value of the output command value for the electric motor is set to be lower than when the amount of charge is not less than the threshold, or the operation of the electric motor is switched to the regenerative operation and the opening degree of the nozzle vane is reduced. That is, the opening degree of the nozzle vane is reduced to increase the boost pressure in response to a decrease in the boost pressure due to a decrease in the output command value for the electric motor or switch to regenerative operation, and thereby it is possible to ensure a boost pressure by the supercharging system while performing a control by the electric motor control part. Thus, it is possible to mitigate deterioration of drivability due to a decrease in the amount of charge of the battery.

Further, the upper limit value of the output command value for the electric motor is set to be lower when the amount of charge of the battery is low, and thereby it is possible to retard exhaustion of the battery. Alternatively, the operation of the electric motor is switched to the regenerative operation when the amount of charge of the battery is low, and thereby it is possible to have the amount of charge of the battery recovered.

Advantageous Effects

According to at least one embodiment of the present invention, provided is a supercharging system provided with a plurality of superchargers, whereby it is possible to mitigate deterioration of drivability due to a decrease in the amount of charge of a battery.

DETAILED DESCRIPTION

Figure 1:
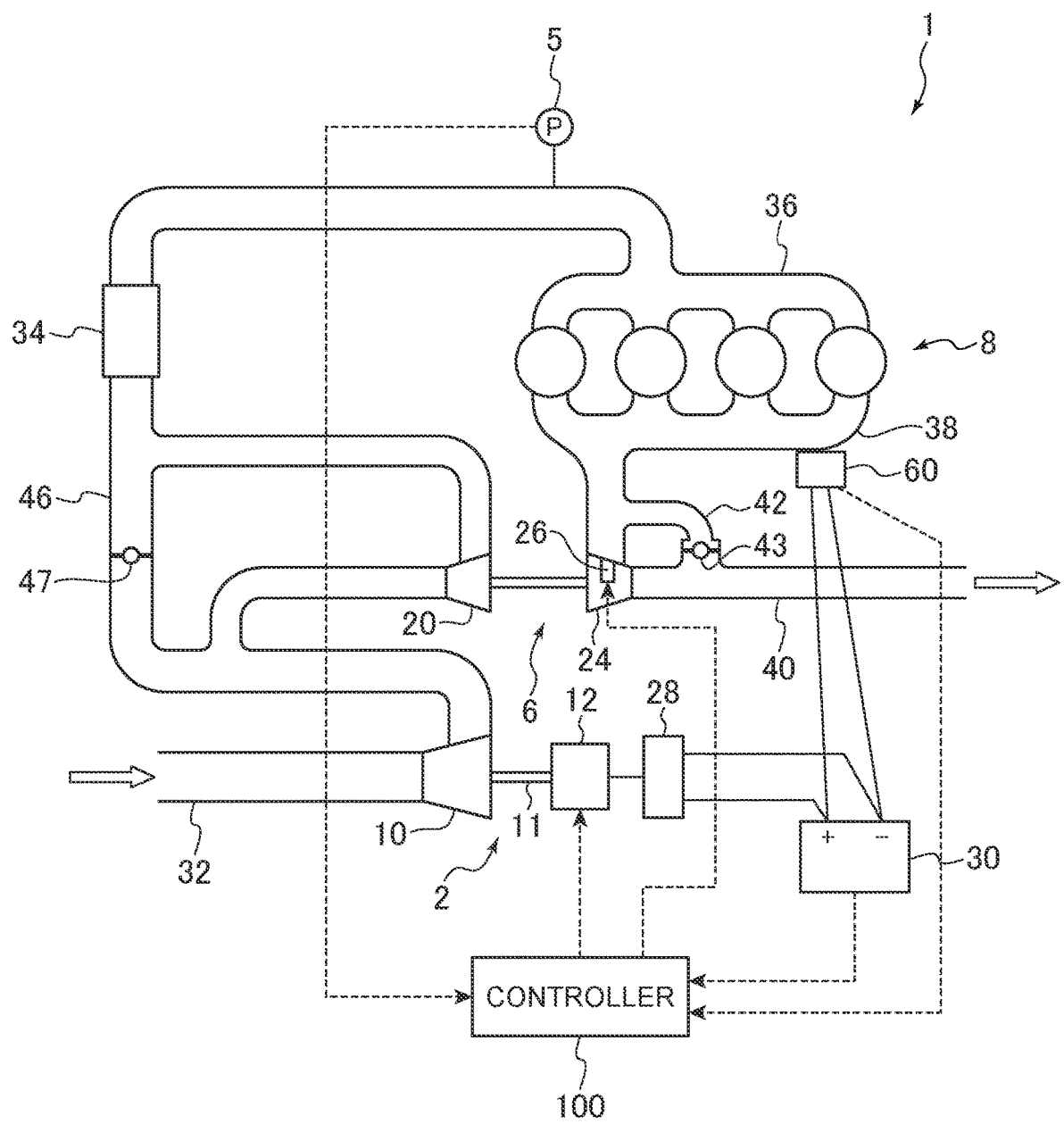
FIG. 1 is a configuration diagram of a supercharging system according to an embodiment.

Embodiments of the present invention will now be described in detail with reference to the accompanying drawings. It is intended, however, that unless particularly specified, dimensions, materials, shapes, relative positions and the like of components described in the embodiments shall be interpreted as illustrative only and not intended to limit the scope of the present invention.

FIGS. 1 to 5 are each a configuration diagram of a supercharging system according to an embodiment. As depicted in FIGS. 1 to 5, a supercharging system 1 includes a low-pressure stage first supercharger 2 including a first compressor 10 for compressing air to be supplied to an engine 8, a high-pressure stage second supercharger 6 including a second compressor 20 for further compressing air compressed by the first compressor 10, and a controller 100 for controlling the first supercharger 2 and the second supercharger 6.

In the supercharging system 1, at least one of the first supercharger 2 and the second supercharger 6 further includes an electric motor 12 for driving the first compressor 10 or the second compressor 20. In the embodiment depicted in each diagram of FIGS. 1 to 5, in the supercharging system 1 depicted in FIGS. 1, 3, and 5, the low-pressure stage first supercharger 2 includes an electric motor 12 for driving the first compressor 10. In the supercharging system 1 depicted in FIGS. 2 and 4, the high-pressure stage second supercharger 6 includes an electric motor 12 for driving the second compressor 20.

Figure 2:
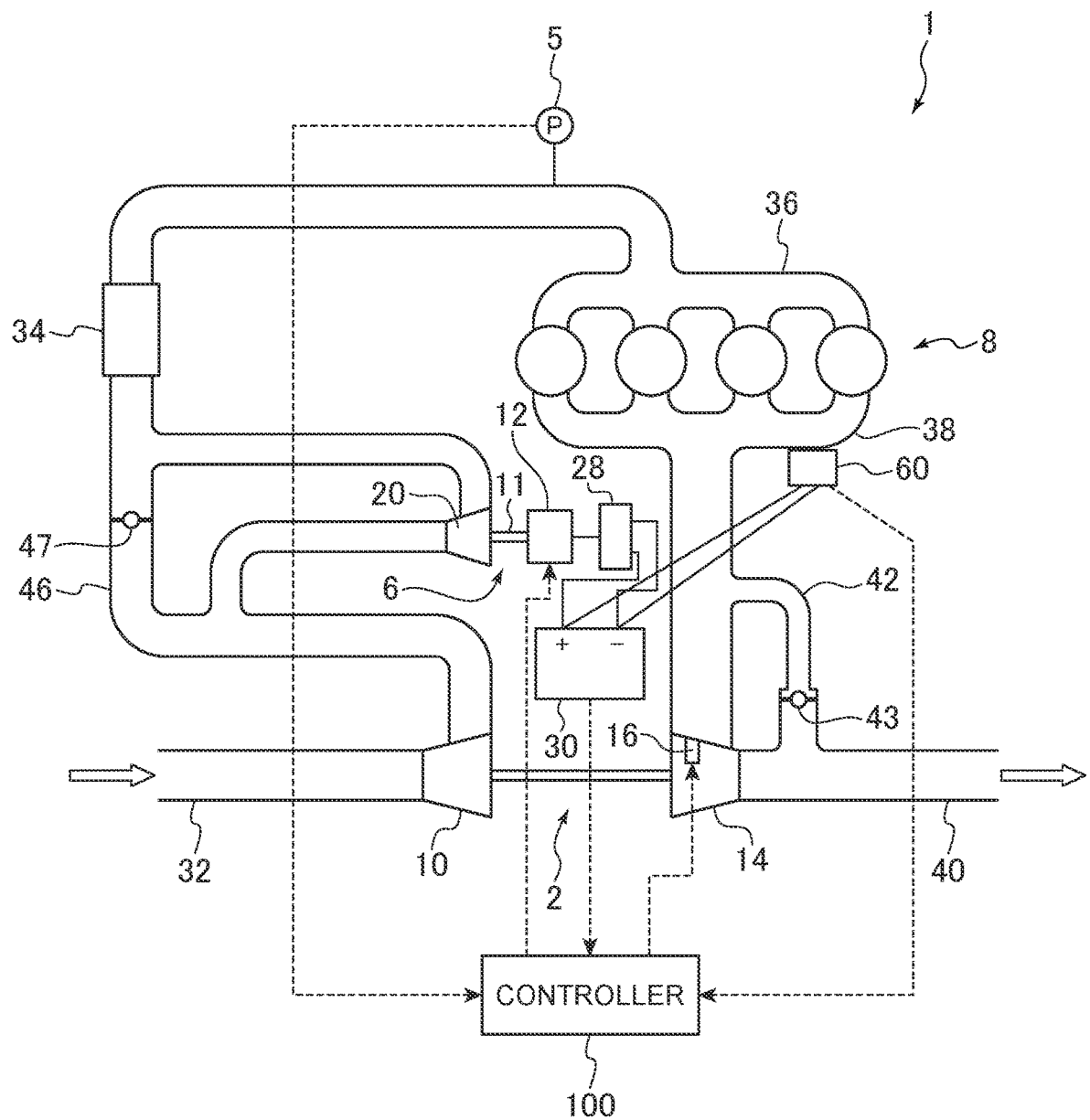
FIG. 2 is a configuration diagram of a supercharging system according to an embodiment.

In FIGS. 1 and 2, the supercharger provided with the electric motor 12 (the first supercharger 2 or the second supercharger 6) is an electric supercharger in which the first compressor 10 or the second compressor 20 is driven by the electric motor 12. The electric motor 12 includes an inverter 28 for converting direct-current voltage from a battery 30 into three-phase alternating current voltage and supplying the alternating current voltage to a motor winding. The electric motor 12 is configured to be supplied with electric power from the battery 30 via the inverter 28, and to generate rotational energy. In this case, the first compressor 10 or the second compressor 20 is connected to the electric motor 12 via a rotational shaft 11, and is rotary driven as the rotational energy generated by the electric motor 12 rotates the rotational shaft 11, and thereby intake air flowing into the first compressor 10 or the second compressor 20 is compressed.

Figure 3:
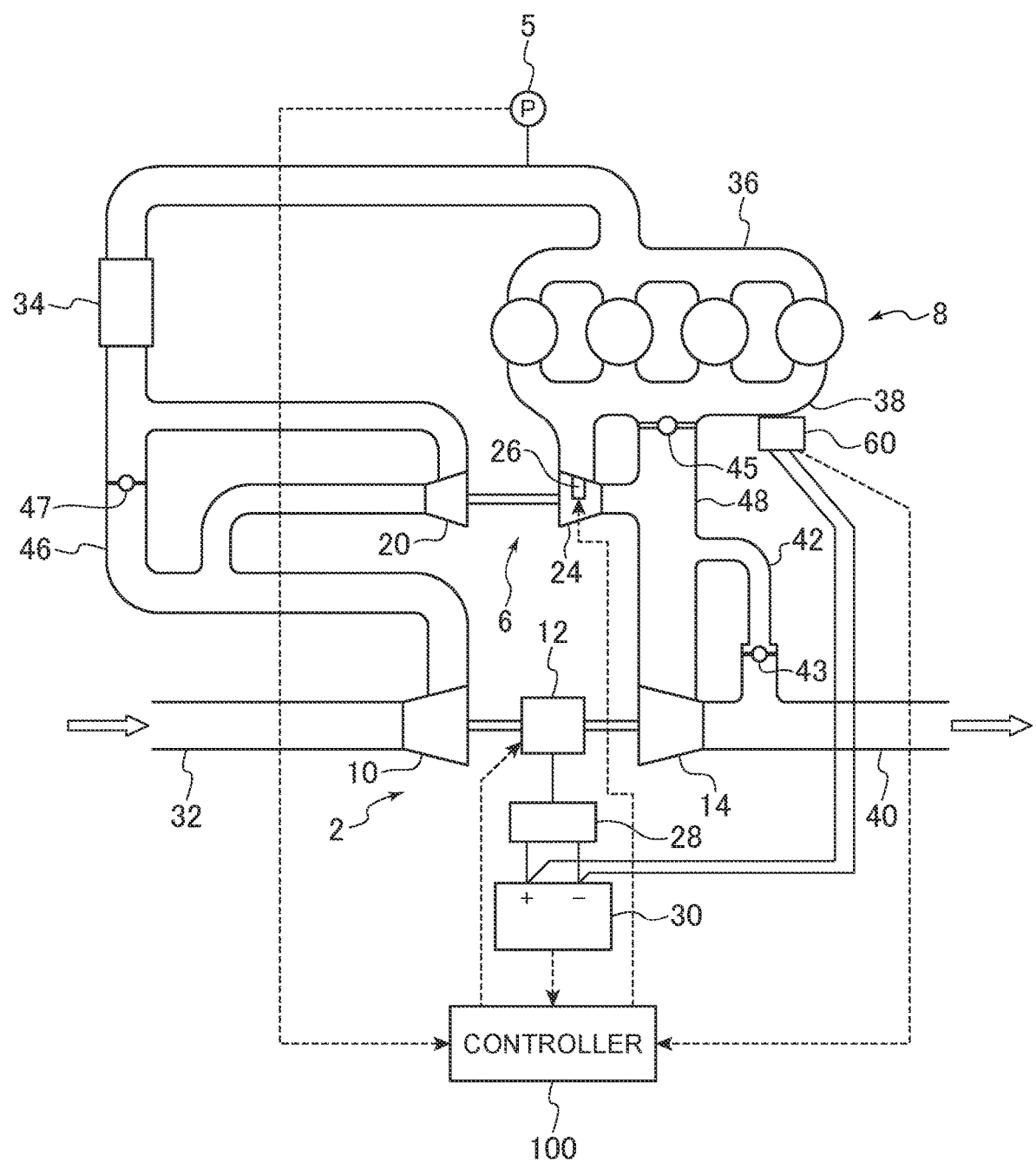
FIG. 3 is a configuration diagram of a supercharging system according to an embodiment.
Figure 4:
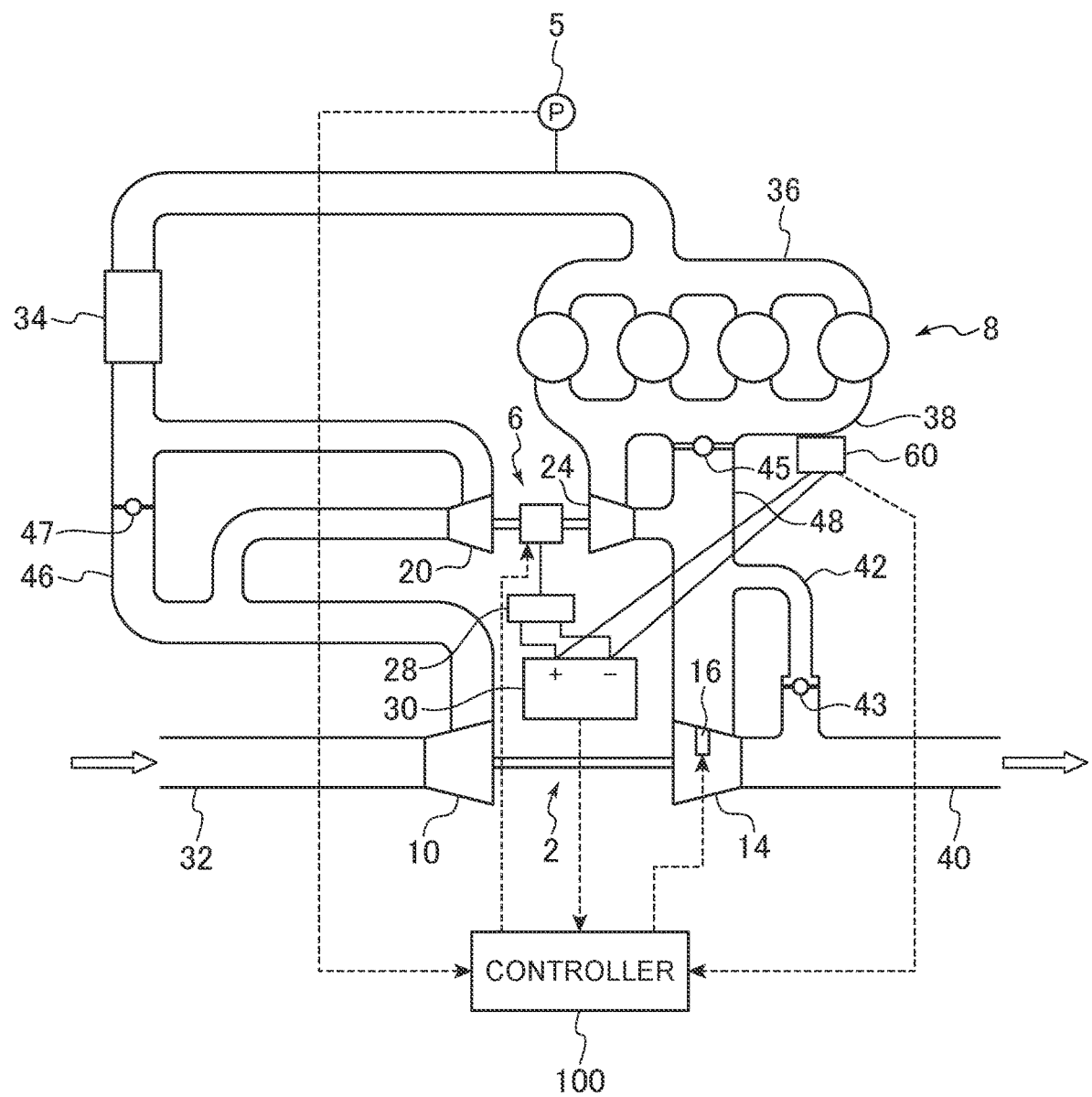
FIG. 4 is a configuration diagram of a supercharging system according to an embodiment.
Figure 5:
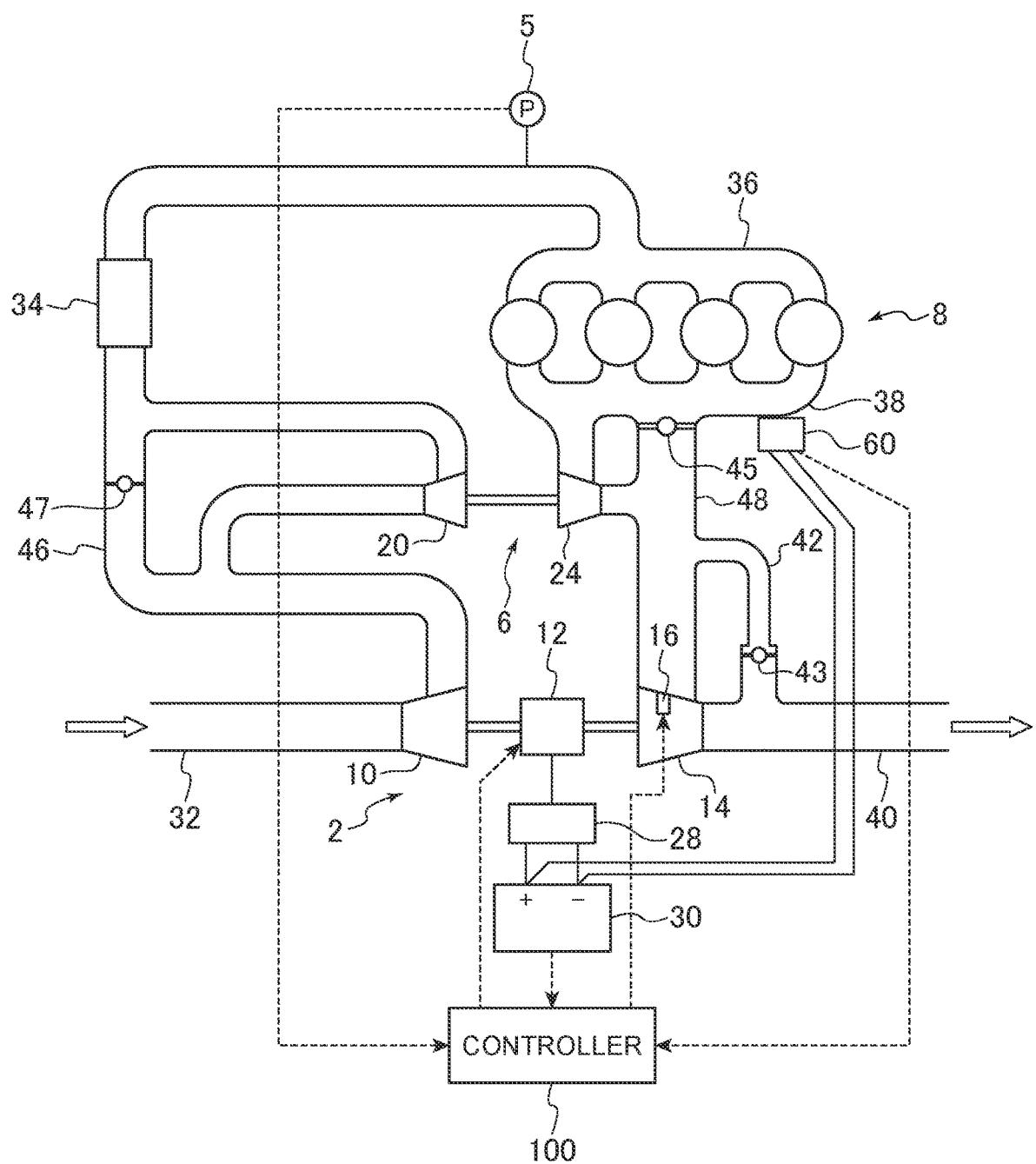
FIG. 5 is a configuration diagram of a supercharging system according to an embodiment.

In FIGS. 3 to 5, the supercharger including the electric motor 12 (the first supercharger 2 or the second supercharger 6) is an electric-assist turbocharger further including a turbine (14 or 24) which is rotary driven by exhaust gas from the engine 8, and the electric motor 12 assists the rotary driving of the turbine (14 or 24) by exhaust gas. In other words, the turbine (14 or 24) can be rotary driven by exhaust gas from the engine 8 and by the electric motor 12. In the first supercharger 2 or the second supercharger 6, the turbine (14 or 24) is connected to the first compressor 10 or the second compressor 20 via the rotational shaft 11, and can rotate about the same axis with the first compressor 10 or the second compressor 20. In the first supercharger 2 or the second supercharger 6, the turbine (14 or 24) is rotary driven by exhaust gas flowing in from the engine 8, which causes the first compressor 10 or the second compressor 20 to be coaxially driven via the rotational shaft 11, and thereby intake air flowing into the first compressor 10 or the second compressor is compressed.

The battery 30 is connected to an alternator 60 driven by the engine 8 to generate power to be supplied to the electric motor 12 and other electric devices mounted to the vehicle, and can store power generated by the alternator 60.

In the supercharger (the first supercharger 2 or the second supercharger 6) including the electric motor 12 depicted in FIGS. 3 to 5, the electric motor 12 includes, similarly to the first supercharger 2 depicted in FIG. 1 and so on, the inverter 28 for converting direct-current voltage from the battery 30 into three-phase alternating current voltage and supplying the alternating current voltage to a motor winding. The electric motor 12 is configured to be supplied with electric power from the battery 30 via the inverter 28, and to generate rotational energy. Further, the electric motor 12 assists rotation of the rotational shaft 11 or rotary driving of the first compressor 10 or the second compressor 20.

Further, in the supercharging system 1, at least one of the first supercharger 2 or the second supercharger 6 includes a turbine (14 or 24) configured to be rotary driven by exhaust gas from the engine 8, and a nozzle vane (16 or 26) configured to adjust the flow-path area of exhaust gas flowing into the turbine (14 or 24).

Among the embodiments depicted in each of FIGS. 1 to 5, in the supercharging system 1 depicted in FIGS. 1 to 3, the high-pressure stage second supercharger 6 includes a nozzle vane 26 configured to adjust the flow-path area of exhaust gas flowing into the turbine 24. Further, in the supercharging system 1 depicted in FIGS. 2, 4, and 5, the low-pressure stage first supercharger 2 includes a nozzle vane 16 configured to adjust the flow-path area of exhaust gas flowing into the turbine 14.

In other words, in the supercharging system 1 depicted in FIGS. 1 to 4, one of the first supercharger 2 and the second supercharger 6 has the electric motor 12, and the other one has the nozzle vane (16 or 26). Furthermore, in the supercharging system 1 depicted in FIG. 5, the first supercharger 2 has the electric motor 12 and the nozzle vane 16.

Figure 6:
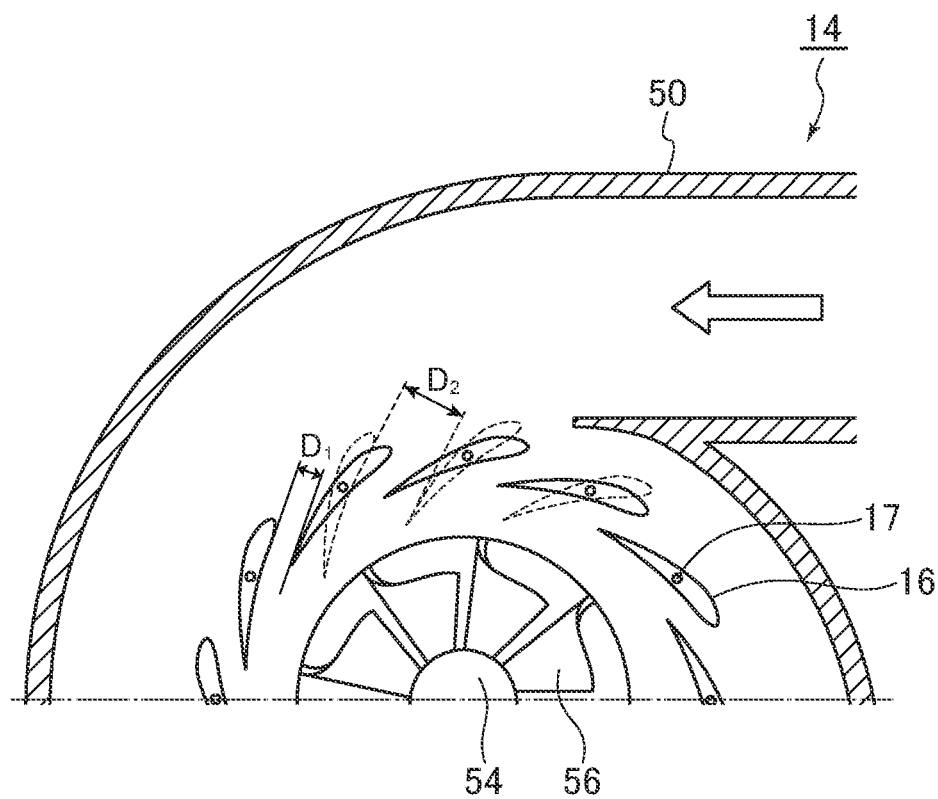
FIG. 6 is a schematic cross-sectional view of a turbine of a supercharger according to an embodiment.

With reference to FIG. 6, adjustment of the flow-path area of exhaust gas by the nozzle vane will be described. FIG. 6 is a schematic cross-sectional view of a turbine (turbine 14) of a supercharger according to an embodiment. While the turbine 14 and the nozzle vanes 16 are described below, the same description also applies to the turbine 24 and the nozzle vane 26. As depicted in FIG. 6, the turbine 14 includes a turbine rotor 54 with a plurality of rotor blades 56 mounted thereto, inside a turbine casing 50. The turbine rotor 54 is connected to the first compressor 10 via the rotational shaft 11. As exhaust gas from the engine 8 flows into the turbine 14, the rotor blades 56 receive a flow of exhaust gas and the turbine rotor 54 rotates, and thereby the first compressor 10 is rotary driven. A plurality of nozzle vanes 16 is disposed on the outer peripheral side of the turbine rotor 54, the nozzle vanes 16 being configured rotatable about support shafts 17 that serve as rotational shafts.

The opening degree of the plurality of nozzle vanes 16 can be changed by rotating the support shafts 17 with an actuator (not depicted). In FIG. 6, nozzle vanes 16a indicated by the dotted line have a larger opening degree than the nozzle vanes 16 indicated by the solid line. In other words, the distance D2 between the nozzle vanes 16a indicated by the dotted line is greater than the distance D1 between the nozzle vanes 16 indicated by the solid line. Thus, the flow-path area of exhaust gas is larger when the opening degree is large than when the opening degree is small.

With the opening degree of the nozzle vanes 16 reduced (i.e. the flow path area of exhaust gas is reduced), the inflow velocity of exhaust gas to the turbine 14 increases, and thus it is possible to increase the boost pressure by the supercharging system 1. Furthermore, with the opening degree of the nozzle vanes 16 expanded (i.e. the flow path area of exhaust gas is increased), the inflow velocity of exhaust gas to the turbine 14 decreases, and thus it is possible to decrease the boost pressure by the supercharging system 1. Accordingly, it is possible to adjust the boost pressure by the supercharging system 1 by adjusting the opening degree of the nozzle vanes 16.

In the supercharging system 1 depicted in FIGS. 1 to 5, air (intake air) introduced into the intake pipe 32 flows into the first compressor 10 of the first supercharger 2, and is compressed by rotation of the first compressor 10. The intake air compressed by the first compressor 10 flows into the second compressor 20 of the second supercharger 6, and is further compressed by rotation of the second compressor 20. The intake air compressed by the second compressor 20 is cooled by an intercooler 34, the amount of the intake air is adjusted by a throttle valve (not depicted), and the intake air is supplied to each cylinder of the engine 8 via an intake manifold 36. Compressed gas and fuel are supplied to each cylinder of the engine 8 to combust and generate exhaust gas, which is discharged to the exhaust pipe 40 via an exhaust manifold 38.

In the intake pipe 32, a pressure sensor 5 may be provided, for measuring a pressure of air to be supplied to the engine 8 (boost pressure), on the further upstream side of the intake manifold 36.

The supercharging system 1 depicted in FIGS. 1 to 5 includes a recirculation passage 46 connecting the upstream side and the downstream side of the second compressor 20 of the second supercharger 6 so as to bypass the compressor 20, disposed in the intake pipe 32 in which the first compressor 10 of the first supercharger 2, which is a low-pressure stage supercharger, and the compressor 20 of the second supercharger 6, which is a high-pressure stage supercharger, are disposed, and a recirculation valve 47 disposed in the recirculation passage 46. To suppress surging in the supercharging system 1, a part of air introduced into the intake pipe 32 and compressed by the first compressor 10 of the first supercharger 2 and the second compressor 20 of the second supercharger 6 can be returned to the inlet of the second compressor 20 of the second supercharger 6 through the recirculation passage 46 via the recirculation valve 47.

In the supercharging system 1 depicted in FIGS. 1 and 2, exhaust gas from the engine 8 flows into the turbine (14 or 24) of the supercharger (the second supercharger 6 in FIG. 1, the first supercharger 2 in FIG. 2) having the nozzle vane (16 or 26), and exhaust gas having performed work in the turbine (14 or 24) is discharged to the exhaust pipe 40.

A bypass pipe 42 bypassing the turbine (14 or 24) may be connected to the exhaust pipe 40, and a waste-gate valve 43 may be disposed in the bypass pipe 42. By adjusting the opening degree of the waste-gate valve 43, it is possible to adjust the flow rate of exhaust gas that flows into the turbine (14 or 24) and the flow rate of exhaust gas that flows through the bypass pipe 42, and thereby it is possible to control the rotation speed of the turbine (14 or 24) and the rotation speed of the compressor (10 or 20) coaxially driven with the turbine 24. The opening degree of the waste-gate valve 43 may be controlled by the controller 100.

In the supercharging system 1 depicted in FIGS. 3 to 5, exhaust gas from the engine 8 flows into the turbine 24 of the second supercharger 6, which is a high-pressure stage supercharger, and to the turbine 14 of the first supercharger 2, which is a low-pressure stage supercharger, in this order, and exhaust gas having performed work in the turbine 14 of the first supercharger 2 is discharged to the exhaust pipe 40.

A bypass pipe 42 bypassing the turbine 14 of the first supercharger 2 may be connected to the exhaust pipe 40, and a waste-gate valve 43 may be disposed in the bypass pipe 42. By adjusting the opening degree of the waste-gate valve 43, it is possible to adjust the flow rate of exhaust gas that flows into the turbine 14 of the first supercharger 2 and the flow rate of exhaust gas that flows through the bypass pipe 42, and thereby it is possible to control the rotation speed of the turbine 14 of the first supercharger 2 and the rotation speed of the compressor (10 or 20) of the low-pressure stage supercharger 90 coaxially driven with the turbine 14. The opening degree of the waste-gate valve 43 may be controlled by the controller 100.

Further, the second bypass flow passage 48 connects the exhaust pipe 40 and the exhaust manifold 38 so as to bypass the turbine 24 of the second supercharger 6. A part of exhaust gas from the engine 8 can flow into the turbine 14 of the first supercharger 2 without passing through the turbine 24 of the second supercharger 6 via a bypass valve 45 disposed in the second bypass flow passage 48. By adjusting the opening degree of the bypass valve 45, it is possible to adjust the flow rate of exhaust gas that flows into the turbine 24 of the second supercharger 6 and the turbine 14 of the first supercharger 2, and thereby it is possible to control the rotation speed of the turbine 24 of the second supercharger 6 and the turbine 14 of the first supercharger 2, as well as the rotation speed of the second compressor 20 of the second supercharger 6 and the first compressor 10 of the first supercharger 2 coaxially driven with the turbine 24 and the turbine 14. The opening degree of the bypass valve 45 may be controlled by the controller 100.

Figure 7:
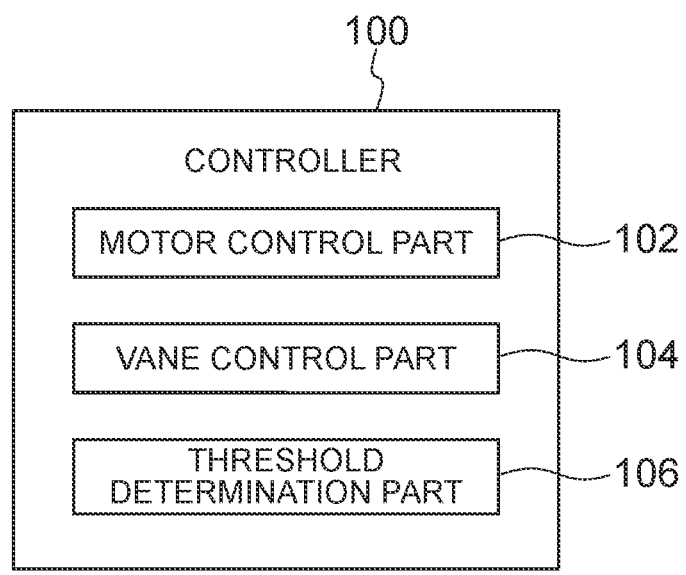
FIG. 7 is a configuration diagram of a control device for a supercharging system according to an embodiment.

FIG. 7 is a configuration diagram of a control device for a supercharging system according to an embodiment. As depicted in FIG. 7, the controller 100 used in the supercharging system 1 according to an embodiment includes an electric motor control part 102 for controlling the electric motor 12, a vane control part 104 for controlling the nozzle vane (16 or 26), and a threshold determination part 106.

The controller 100 may be an ECU for controlling the supercharging system 1. Further, the controller 100 may be an ECU provided independently from an engine ECU for controlling the engine 8.

The controller 100 may be a microcomputer comprising a central processing unit (CPU), a random access memory (RAM), a read only memory (ROM), and an I/O interface.

Figure 8:
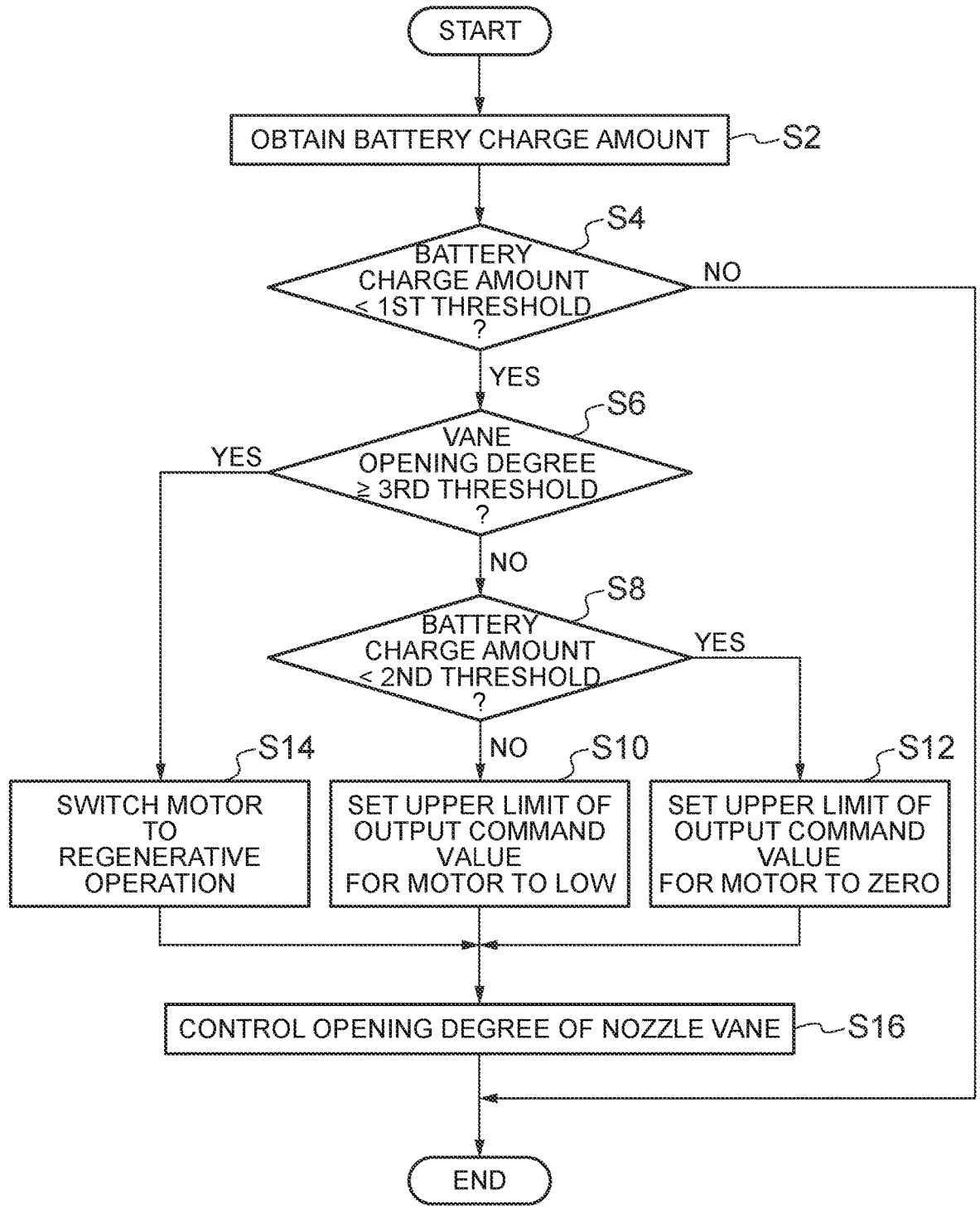
FIG. 8 is a flowchart of a method for operating a supercharging system according to an embodiment.

A method for operating the supercharging system 1 using the controller 100 according to an embodiment now will be described along the flowchart of FIG. 8. FIG. 8 is a flowchart of a method for operating a supercharging system according to an embodiment.

An amount of charge of the battery 30 for supplying power to the electric motor 12 of the first supercharger 2 or the second supercharger 6 is obtained (S2). The obtained amount of charge is sent to the controller 100 as an electric signal.

Next, the controller 100 determines whether the amount of charge of the battery 30 in S2 is less than the first threshold set in advance (S4). The controller 100 may include a storage part (memory), and the first threshold may be stored in the storage part in advance. Further, the controller 100 may be configured to compare the first threshold stored in the storage part to the amount of charge of the battery 30.

If it is determined in S4 that the amount of charge of the battery 30 is not less than the first threshold (No in S4), the flow is just ended. Alternatively, the flow may return to S2 and perform the step of obtaining the amount of charge of the battery 30.

If it is determined in S4 that the amount of charge of the battery 30 is less than the first threshold (YES in S4), the electric motor control part 102 sets an upper limit value of the output command value for the electric motor 12 to be lower than when the amount of charge of the battery 30 is not less than the first threshold, and controls the output of the electric motor 12 to be within a range that does not exceed the upper limit value (S10 or S12), or, alternatively, switches the operation of the electric motor 12 to regenerative operation to charge the battery 30 (S14). Further, the vane control part 104 controls the opening degree of the nozzle vane (16 or 26) so that the flow-path area of exhaust gas from the engine 8 flowing into the turbine (14 or 24) of the first supercharger 2 or the second supercharger 6 decreases, with the above described control of the electric motor 12 by the electric motor control part 102.

As described above, when the amount of charge of the battery 30 decreases and becomes less than the first threshold, the upper limit value of the output command value for the electric motor 12 is set to be lower than when the amount of charge is not less than the first threshold, or the operation of the electric motor 12 is switched to the regenerative operation and the opening degree of the nozzle vane (16 or 26) is reduced. That is, the opening degree of the nozzle vane (16 or 26) is reduced to increase the boost pressure in response to a decrease in the boost pressure due to a decrease in the output command value for the electric motor 12 or switch to regenerative operation, and thereby it is possible to ensure a boost pressure by the supercharging system 1 while performing a control by the electric motor control part 102. Thus, it is possible to mitigate deterioration of drivability due to a decrease in the amount of charge of the battery 30.

Further, the upper limit value of the output command value for the electric motor 12 is set to be lower when the amount of charge of the battery 30 is low, and thereby it is possible to retard exhaustion of the battery 30. Alternatively, the operation of the electric motor 12 is switched to the regenerative operation when the amount of charge of the battery 30 is low, and thereby it is possible to have the amount of charge of the battery 30 recovered.

To control the output of the electric motor 12, the electric motor control part 102 may control the voltage that the inverter 28 applies to the electric motor 12 so as to obtain a desired output from the electric motor 12.

If it is determined that the amount of charge of the battery 30 is less than the first threshold in the above described S4 (Yes in S4), the controller 100 further determines whether the opening degree of the nozzle vane (16 or 26) is not less than the third threshold (S6), and if the opening degree of the nozzle vane (16 or 26) is not less than the third threshold (Yes in S6), the electric motor control part 102 may switch the operation of the electric motor 12 to regenerative operation.

Switching the operation of the electric motor 12 to regenerative operation when the opening degree of the nozzle vane (16 or 26) is not less than a predetermined third threshold, that is, when there is room to reduce the opening degree of the nozzle vane (16 or 26) to below the third threshold to further increase the boost pressure, it is possible to recover the amount of charge of the battery 30 through regenerative operation while maintaining the boost pressure.

The third threshold may be stored in advance in the storage part of the controller 100. Further, the controller 100 may be configured to compare the third threshold stored in the storage part to the opening degree of the nozzle vane (16 or 26).

Further, if it is determined that the amount of charge of the battery 30 is less than the first threshold in the above described S4 (Yes in S4), the controller 100 may further determine whether the amount of charge of the battery 30 is less than the second threshold which is smaller than the first threshold (S8). If it is determined in S8 that the amount of charge of the battery 30 is not less than the second threshold (No in S8), the electric motor control part 102 sets the upper limit value of the output command value for the electric motor 12 to be larger than zero and smaller than when the amount of charge of the battery 30 is not less than the first threshold (S10). On the other hand, if it is determined in S8 that the amount of charge of the battery 30 is less than the second threshold (Yes in S8), the electric motor control part 102 sets the upper limit value of the output command value for the electric motor 12 to zero (S12).

Accordingly, the upper limit value of the output command value for the electric motor 12 is reduced in stages with a decrease in the amount of charge of the battery 30. Thus, compared to a case in which the electric motor 12 is stopped immediately after the amount of charge of the battery 30 becomes low, the output of the electric motor 12 is reduced gradually, which mitigates deterioration of drivability.

The second threshold may be stored in advance in the storage part of the controller 100. Further, the controller 100 may be configured to compare the second threshold stored in the storage part and the amount of charge of the battery 30.

Figure 9:
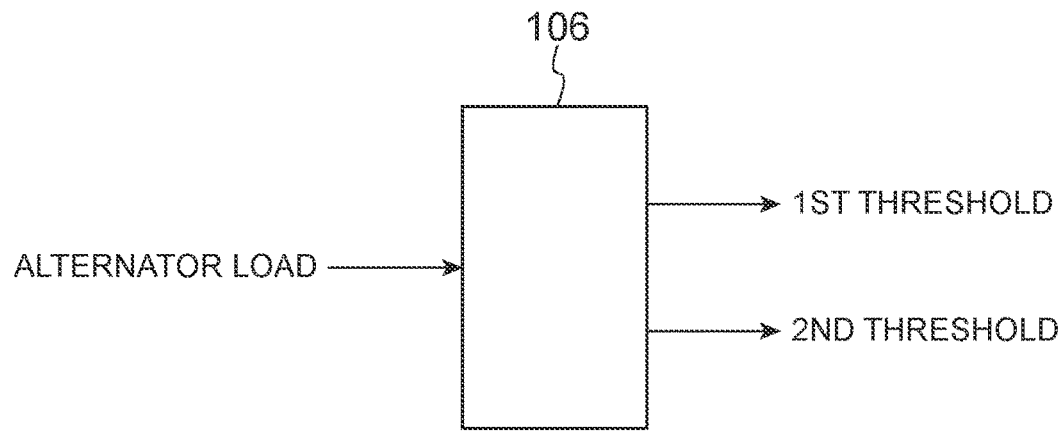
FIG. 9 is a diagram showing a processing flow by a threshold determination part according to an embodiment.

FIG. 9 is a diagram showing a processing flow by a threshold determination part according to an embodiment. In an embodiment, as depicted in FIG. 9, the first threshold in S4 and the second threshold in S8 are determined by the threshold determination part 106 on the basis of a load of the alternator 60 driven by the engine 8 to generate power to be supplied to the electric motor 12. Specifically, the first and second thresholds are variable in response to the load of the alternator 60.

By determining the threshold (first threshold and second threshold) for the amount of charge of the battery 30 that limits the upper limit value of the output command value for the electric motor 12 in response to the load of the alternator 60, it is possible to control the output of the electric motor 12 appropriately in response to the power supply condition by the alternator 60 and the battery 30.

For instance, the threshold determination part 106 is configured to increase the first threshold and the second threshold as the load of the alternator 60 increases.

When the load of the alternator 60 increases and the output margin of the alternator 60 decreases, the first threshold and the second threshold are increased and the output of the electric motor 12 is limited while the amount of charge of the battery 30 is relatively large, and thereby it is possible to maintain the amount of charge of the battery 30 appropriately.

Figure 10:
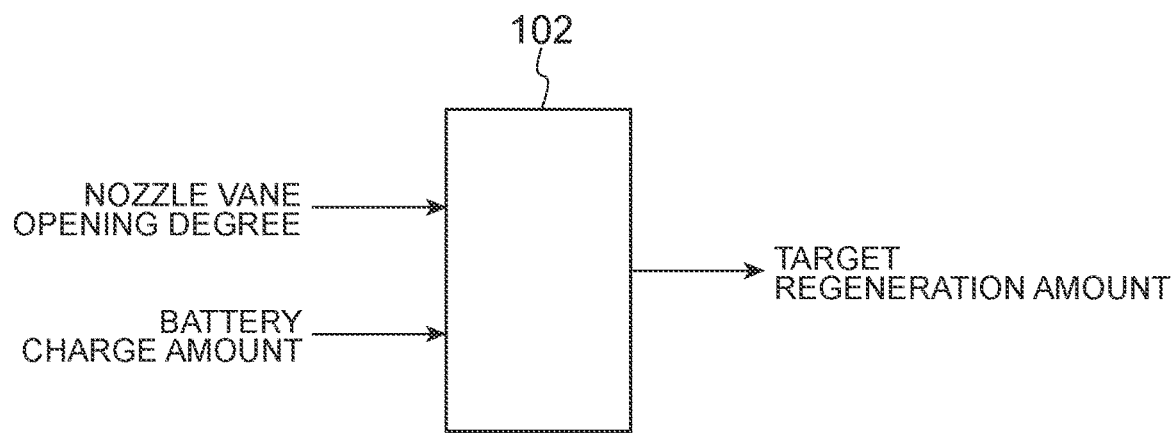
FIG. 10 is a diagram showing a processing flow of an electric motor control part according to an embodiment.

FIG. 10 is a diagram showing a processing flow of an electric motor control part according to an embodiment. In an embodiment, the target regeneration amount by the electric motor 12 upon switch of the operation of the electric motor 12 to regenerative operation in S14 is, as depicted in FIG. 10, determined by the electric motor control part 102 on the basis of the opening degree of the nozzle vane (16 or 26). Further, the electric motor control part 102 controls the regeneration amount by the electric motor 12 to the determined target regeneration amount.

By controlling the regeneration amount by the electric motor 12 to the target regeneration amount determined on the basis of the opening degree of the nozzle vane (16 or 26), it is possible to perform regenerative operation of the electric motor 12 at an appropriate regenerative amount corresponding to the opening degree of the nozzle vane (16 or 26). For instance, it is possible to prevent shortage of the boost pressure due to regenerative operation at an excessive regenerative amount.

For instance, the electric motor control part 102 is configured to reduce the target regeneration amount with a decrease in the opening degree of the nozzle vane (16 or 26).

In this case, the target regeneration amount is reduced as the opening degree of the nozzle vane (16 or 26) decreases and the room to make up for shortage of supercharging decreases, and thus it is possible to maintain the boost pressure by the supercharging system 1 appropriately.

Further, in an embodiment, the target regeneration amount by the electric motor 12 upon switch of the operation of the electric motor 12 to regenerative operation in S14 is, as depicted in FIG. 10, determined by the electric motor control part 102 on the basis of the amount of charge of the battery 30. Further, the electric motor control part 102 controls the regeneration amount by the electric motor 12 to the determined target regeneration amount.

By controlling the regeneration amount by the electric motor 12 to the target regeneration amount determined on the basis of the amount of charge of the battery 30, it is possible to perform regenerative operation of the electric motor 12 at an appropriate regenerative amount corresponding to the amount of charge of the battery 30.

For instance, the electric motor control part 102 is configured to reduce the target regeneration amount by the electric motor 12 with a decrease in the difference between the maximum capacity of the battery 30 and the amount of charge of the battery 30.

In this case, if there is a sufficient amount of charge in the battery 30, the target regeneration amount is set to be low, and thereby the regeneration amount is reduced and the boost pressure by the supercharging system can be ensured in priority.

Meanwhile, in the supercharging system 1 according to an embodiment, one of the first supercharger 2 or the second supercharger 6 is an electric supercharger including the electric motor 12 coupled to the first compressor 10 or the second compressor 20, and the electric motor control part 102 is configured to set the upper limit value of the output command value for the electric motor 12 to zero when the amount of charge of the battery 30 is less than the first threshold, and the electric motor 12 is driven in the regeneration mode through rotation of the first compressor 10 or the second compressor 20 by intake air.

An electric supercharger is not provided with a turbine, and thus cannot operate the electric motor 12 regeneratively with energy recovered from exhaust gas of the engine 8.

Thus, by setting the output of the electric motor 12 to zero and driving the electric motor 12 in the regeneration mode through rotation of the compressor by intake air, it is possible to regeneratively operate the electric motor 12 of the electric supercharger to charge the battery 30.

For instance, in the supercharging system 1 depicted in FIG. 1, the low-pressure stage first supercharger 2 is an electric supercharger including the electric motor 12 coupled to the first compressor 10, and the high-pressure stage second supercharger 6 is a turbocharger including the turbine 24 and the nozzle vane 26. In the above supercharging system 1, the first compressor 10 of the first supercharger 2 (electric supercharger) is configured to rotate through intake of air from the intake pipe 32, when the upper limit of the output command value for the electric motor 12 is set to zero (the output of the electric motor 12 is set to zero) and the second supercharger 6 is driven by exhaust energy from the engine 8. Further, the electric motor 12 is configured to be driven in the regeneration mode (i.e. as a generator) through rotation of the first compressor. Accordingly, when the amount of charge of the battery 30 is less than the first threshold, the upper limit of the output command value for the electric motor 12 is set to zero and the electric motor 12 of the electric supercharger is regeneratively operated, and thereby the battery 30 can be charged.

Further, in this case, the vane control part 104 may control the opening degree of the nozzle vane 26 so that the flow-path area of exhaust gas from the engine 8 flowing into the turbine 24 decreases, thereby maintaining the boost pressure by the supercharging system 1.

Embodiments of the present invention were described in detail above, but the present invention is not limited thereto, and various amendments and modifications may be implemented.

Further, in the present specification, an expression of relative or absolute arrangement such as "in a direction", "along a direction", "parallel", "orthogonal", "centered", "concentric" and "coaxial" shall not be construed as indicating only the arrangement in a strict literal sense, but also includes a state where the arrangement is relatively displaced by a tolerance, or by an angle or a distance whereby it is possible to achieve the same function.

For instance, an expression of an equal state such as "same" "equal" and "uniform" shall not be construed as indicating only the state in which the feature is strictly equal, but also includes a state in which there is a tolerance or a difference that can still achieve the same function.

On the other hand, an expression such as "comprise", "include", "have", "contain" and "constitute" are not intended to be exclusive of other components.

DESCRIPTION OF REFERENCE NUMERALS

1 Supercharging system
2 First supercharger
5 Pressure sensor
6 Second supercharger
8 Engine
10 First compressor
11 Rotational shaft
12 Motor
14 Turbine
16 Nozzle vane
17 Support shaft
20 Second compressor
24 Turbine
26 Nozzle vane
28 Inverter
30 Battery
32 Intake pipe
34 Inter cooler
36 Intake manifold
38 Exhaust manifold
40 Exhaust pipe
42 Bypass pipe
43 Waste-gate valve
45 Bypass valve
46 Recirculation passage
47 Recirculation valve
48 Second bypass flow passage
50 Turbine casing
54 Turbine rotor
56 Rotor blade
60 Alternator
90 Low-pressure stage supercharger
100 Controller
102 Motor control part
104 Vane control part
106 Threshold determination part

The invention claimed is:

1. A supercharging system, comprising:
a first supercharger including a first compressor for compressing air to be supplied to an engine;
a second supercharger including a second compressor for further compressing air compressed by the first compressor; and
a controller for controlling the first supercharger and the second supercharger,
wherein one of the first supercharger and the second supercharger further includes an electric motor for driving corresponding one of the first compressor or the second compressor,
wherein at least one of the first supercharger or the second supercharger further includes a turbine configured to be rotary driven by exhaust gas from the engine, and a nozzle vane configured to adjust a flow-path area of the exhaust gas flowing into the turbine, and
wherein the controller includes:
an electric motor control part configured to, if an amount of charge of the battery for supplying electric power to the electric motor is less than a first threshold, set an upper limit value of an output command value for the electric motor to be lower than when the amount of charge of the battery is not less than the first threshold, or switch operation of the electric motor to regenerative operation, and if the amount of charge of the battery is less than the first threshold and not less than a second threshold which is smaller than the first threshold, set the upper limit value of the output command value for the electric motor to a value which is greater than zero and smaller than when the amount of charge of the battery is not less than the first threshold; and a vane control part configured to, if the amount of charge of the battery is less than the first threshold, control an opening degree of the nozzle vane so that the flow-path area decreases with a control of the electric motor by the electric motor control part, wherein the controller further includes a threshold determination part configured to determine the first threshold and the second threshold on the basis of a load of an alternator configured to be driven by the engine to generate electric power to be supplied to the electric motor; and if the amount of charge of the battery is less than the first threshold and the opening degree of the nozzle vane is not less than a third threshold, switch the operation of the electric motor to the regenerative operation.

2. The supercharging system according to claim 1, wherein the electric motor control part is configured to:
set, if the amount of charge of the battery is less than the second threshold, the upper limit value of the output command value for the electric motor to zero.

3. The supercharging system according to claim 1, wherein the threshold determination part is configured to increase the first threshold and the second threshold with an increase in the load of the alternator.

4. The supercharging system according to claim 1, wherein the first supercharger includes both the electric motor and the nozzle vane, and
wherein the electric motor control part is configured to determine a target amount of electric power to be regenerated to charge the battery by rotating the electric motor by the turbine on the basis of the opening degree of the nozzle vane and to control an amount of electric power generated by the electric motor to match the target regeneration amount.

5. The supercharging system according to claim 4, wherein the electric motor control part is configured to reduce the target amount with a decrease in the opening degree of the nozzle vane.

6. The supercharging system according to claim 1, wherein the electric motor control part is configured to determine a target amount of electric power to be regenerated to charge the battery by rotating the electric motor by the turbine on the basis of an amount of charge of the battery and to control an amount of electric power generated by the electric motor to match the target regeneration amount.

7. The supercharging system according to claim 6, wherein the electric motor control part is configured to reduce the target amount with a decrease in a difference between a maximum capacity of the battery and the amount of charge of the battery.

8. The supercharging system according to claim 1, wherein the one of the first supercharger or the second supercharger is an electric motor-driven supercharger including the electric motor coupled to the first compressor or the second compressor, and
wherein the electric motor control part is configured to, if the amount of charge of the battery is less than the first threshold, set the upper limit value of the output command value to zero, and drive the electric motor in a regeneration mode through rotation of the first compressor or the second compressor by intake air.

9. A method of operating a supercharging system which comprises:
a first supercharger including a first compressor for compressing air to be supplied to an engine; and
a second supercharger including a second compressor for further compressing air compressed by the first compressor,
one of the first supercharger and the second supercharger further including an electric motor for driving corresponding one of the first compressor or the second compressor, and
at least one of the first supercharger or the second supercharger further including a turbine configured to be rotary driven by exhaust gas from the engine, and a nozzle vane configured to adjust a flow-path area of the exhaust gas flowing into the turbine,
the method comprising:
an amount-of-charge obtaining step of obtaining an amount of charge of a battery for supplying electric power to the electric motor;
an electric motor control step of, if the amount of charge of the battery is less than a first threshold, setting an upper limit value of an output command value for the electric motor to be lower than when the amount of charge of the battery is not less than the first threshold, or switching operation of the electric motor to regenerative operation, and if the amount of charge of the battery is less than the first threshold and not less than a second threshold which is smaller than the first threshold, setting the upper limit value of the output command value for the electric motor to a value which is greater than zero and smaller than when the amount of charge of the battery is not less than the first threshold; and
a vane control step of, if the amount of charge of the battery is less than the first threshold, controlling an opening degree of the nozzle vane so that the flow-path area decreases with a control of the electric motor in the electric motor control step,
wherein the first threshold and the second threshold are determined on the basis of a load of an alternator configured to be driven by the engine to generate electric power to be supplied to the electric motor; and
if the amount of charge of the battery is less than the first threshold and the opening degree of the nozzle vane is not less than a third threshold, switch the operation of the electric motor to the regenerative operation.

* * * * *